United States Patent Office 3,197,866
Patented Aug. 3, 1965

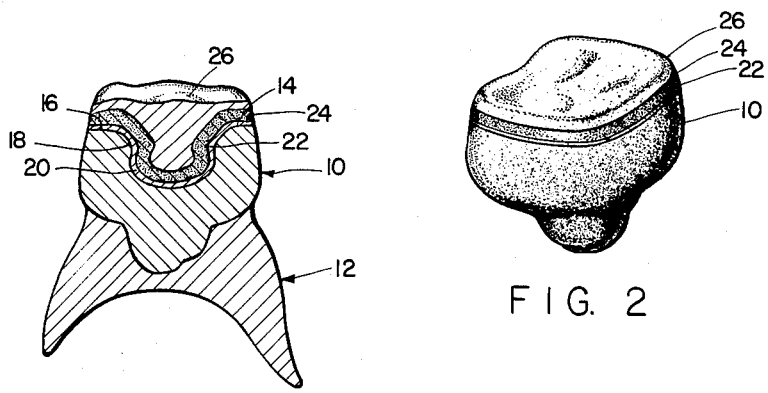
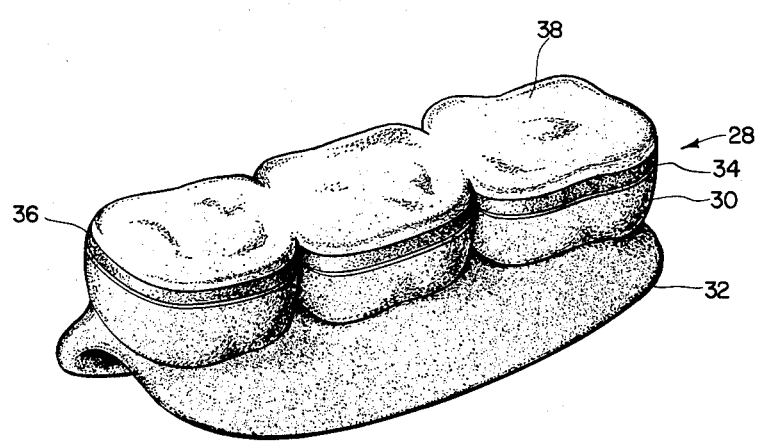

3,197,866
DENTAL PROSTHETIC APPLIANCE
Joseph B. Barron, 64 Beethoven Ave., Newton, Mass.
Filed Nov. 1, 1962, Ser. No. 234,702
2 Claims. (Cl. 32—5)

This invention relates generally to devices for use in dental prosthesis and more particularly is directed towards a dental prosthetic appliance featuring a self-contained artificial periodontal membrane.

Anatomically, each human tooth consists of a crown and a root. The root is imbedded within a bony socket of the jaw and supports the crown in its masticatory function. The human tooth is not fused with the jawbone but suspended within the socket by means of the fibers of the periodontal membrane. This is a ligament which attaches the cementum of the tooth to the alveolar bone.

The periodontal membrane is the fibrous connective tissue which fills the space between the root of the tooth and the bony wall of its alveolar socket. It has three functions; to connect the tooth with the adjacent hard and soft tissues, to form the bone on the wall of the socket and cementum on the root and to serve as the seat of the sense of touch for the tooth.

The arrangement of the principal fibers is well adapted to sustain the tooth against the masticatory forces and to help it to absorb shock. The aveolar bone is that part of the jawbone which forms the sockets for the teeth. The sockets persist only as long as the tooth is present and functional.

Where teeth are missing by congenital defects, extraction, accident or disease, it is the current practice to replace the teeth with an artificial substitute. Dentures of this type are either partial or complete, the former being used when some teeth are present and the latter being used when all the teeth are missing. Bridges are used when there are teeth present at each end of the missing space to support the prosthesis and may be fixed or removable depending upon the position, strength of supporting teeth and other pertinent factors.

The fabrication of artificial teeth has reached a rather high level in the art and may be made extremely life-like by color matching the denture to the natural tooth pigment of any existing natural teeth and by faithfully copying the contours of existing teeth. The materials used in artificial dentures may be of a hard acrylic plastic, porcelain or the like which have an appearance very similar to the natural tooth and which are rather durable. However, artificial teeth heretofore have not been entirely satisfactory from the standpoint of providing a substitute for the function of the periodontal membrane. Where there is no cushion between the artificial tooth and the supporting gum, the mucous membrane will become irritated or tender when pressure is transmitted through the tooth. While various types of pads may be mounted over the gum, these have not furnished a satisfactory solution since they impair the fit of the denture and result in a more or less loose fitting appliance.

Accordingly, it is an object of the present invention to provide improvements in artificial dentures.

Another object of this invention is to provide an effective substitute for the periodontal membrane in appliances for dental prosthesis.

Still another object of this invention is to provide an artificial tooth capable of functioning in a comfortable and a lifelike fashion.

More particularly, this invention features a dental prosthetic appliance having a crown portion in which is formed a cavity open towards the biting end of the tooth and being lined with a resilient stratum for resiliently supporting a cap which provides the biting edge. According to the invention, the masticating surface or cap of the artificial tooth is displaceable within limits of the resilient stratum while the remaining crown portion of the tooth is held stationary.

But these and other features of the invention, along with further objects and advantages thereof, will become more readily apparent from the following detailed description of preferred embodiments of the invention, with reference being made to the accompanying drawings, in which FIG. 1 is a sectional view in side elevation of an artificial tooth made according to the invention, FIG. 2 is a perspective view of an articial crown, and FIG. 3 is a perspective view of a modification thereof.

Referring now more particularly to the drawings, the reference character 10 generally indicates an artificial crown in the form of a molar tooth and fabricated from a suitable prosthetic material, such as acrylic plastic, porcelain or the like. The crown 10 is permanently attached to a saddle shaped denture base 12 normally pigmented to match the gum over which it is mounted and the crown 10 will be color matched to existing teeth.

The crown 10 is formed with a reentrant cavity 14 having an inwardly and downwardly inclined annular wall 16 which forms into an annular edge 18. The edge, in turn, merges into an enlarged hemispherical bottom wall 20. This configuration of the cavity walls provides a positive locking engagement for structural components that are to be subsequently applied.

Lining the walls of the cavity 14 is a stratum 22 typically fabricated from gold, silver, steel or the like, and adapted to be bonded to an overlaying resilient stratum 24. The stratum 24 typically is of a resilient plastic material such as silicon rubber. Silicon rubber is a linear condensation polymer based on a dimethyl silicon polymer. It is a very stable rubber maintaining flexibility over a wide range of temperatures and is unaffected by materials that normally enter the mouth. There are various other resilient materials that could be employed for the stratum 24 and the particular thickness of the stratum may be varied as desired.

Bonded to the upper surface of the resilient stratum 24 and filling in the remaining portion of the cavity 14 is a cap 26 which presents an irregular biting surface adapted to perform normal masticating functions. The cap 26 may be formed from the same material as the stratum 22 or may be matched to the body of the crown 10 to present an even more natural appearance. In any event, the cap 26 is resiliently mounted to the crown 10 so that shocks and stresses applied to the cap will be absorbed by the stratum 24 rather than being transmitted to the supporting gum. It will be appreciated that the cap 26 may be displaced to a limited extent during chewing or biting and may pivot to a certain degree when the opposing tooth bites the cap off center. Thus, the appliance may be closely fitted to the gum and yet still provide a satisfactory substitute for the periodontal membrane. It will also be appreciated that the biting action provided by the tooth closely parallels that of a natural tooth.

In FIG. 3 there is illustrated a modification of the invention and in this embodiment a partial plate 28 is formed by integrating a number of artificial crowns 30 in side by side relation. The crowns 30 are mounted over an elongated saddle shaped dental base 32 of the same general shape as the base 12 of FIG. 1. The device is formed with a single cavity which extends lengthwise between the three crowns and is in the general form of a trough having a cross-section similar to that of the cavity 14 in FIG. 1.

As in the principal embodiment, the cavity is lined with a stratum 24 which adheres to the walls of the cavity on one side and adheres to a resilient stratum 36 on its opposite side. An elongated cap 38 covers the resilient stratum 36 and fills the remaining part of the cavity to provide an elongated, one-piece biting surface for the plate 28. As before, the stratum 24 may be formed from gold, silver or the like, the stratum 36 may be formed from silicon rubber, for example, and the cap 38 may be formed from silver, gold, steel, plastic or the like. By fabricating the plate in this fashion, a very rugged and durable plate is provided.

It will be appreciated that the above described invention will provide an improved denture since there will be no uncomfortable pressures applied to the supporting gum during normal wear and use. It will also be appreciated that by mounting the cap in a resilient fashion near the biting end of the tooth that the entire prosthesis may be fitted more closely to the wearer and that it will be more comfortable in use by reason of the artificial periodontal membrane.

While the invention has been described with particular reference to the illustrated embodiments, it will be understood that numerous modifications thereto will appear to those skilled in the art. It will also be understood that the above description and drawings should be taken as illustrative of the invention and not in a limiting sense.

Having thus described the invention, what I claim and desire to obtain by Letters Patent of the United States is:

1. A partial plate for dental prosthesis and the like, comprising a plurality of artificial crowns having the general coloring and configuration of natural teeth and integrally joined in side by side relation, said crowns being formed with an intercommunicating central cavity open across the biting portions of said teeth, a stratum of jacket-adhering material lining the walls of said cavity, a stratum of resilient material overlying said first mentioned stratum and adhering thereto and an elongated one-piece cap filling the remainder of said cavity and adhering to said second mentioned stratum.

2. A partial plate for dental prosthesis and the like, comprising a plurality of artificial crown portions having the general coloring and configuration of natural teeth and integrally joined in side by side relation, said crown portions being formed with a single intercommunicating central cavity of reentrant cross section and open across the biting portion of said teeth, a stratum of resilient material overlying the walls of said cavity and adhering thereto and a one-piece cap filling the remainder of said cavity and adhering to said stratum.

References Cited by the Examiner

UNITED STATES PATENTS 1,105,476    7/14    Withycombe _____ 32—10

RICHARD A. GAUDET, *Primary Examiner.*

ROBERT E. MORGAN, *Examiner.*